US005478096A

United States Patent [19]

Ting

[11] Patent Number: 5,478,096

[45] Date of Patent: Dec. 26, 1995

[54] COLLAPSIBLE MULTI-USE BABY CARRIAGE

[76] Inventor: Chi-en Ting, 79, Alley 2, Sheng-Li St., Yung-Kang City, Tainan Shien, Taiwan

[21] Appl. No.: 279,016

[22] Filed: Jul. 22, 1994

[51] Int. Cl.[6] .......... B62B 7/10

[52] U.S. Cl. .......... 280/30; 108/68; 280/643; 280/648; 297/17

[58] Field of Search .......... 108/67, 68; 280/30, 280/642, 643, 648, 650, 47.38, 47.4; 297/17, 19, 118

[56] References Cited

U.S. PATENT DOCUMENTS

| | | | |
|---|---|---|---|
| D. 345,326 | 3/1994 | Liu | D12/133 |
| 2,588,706 | 3/1952 | Davis | 108/68 X |
| 2,726,911 | 12/1955 | Mason | 108/68 X |
| 4,736,959 | 4/1988 | Steenburg | 280/30 |
| 4,763,911 | 8/1988 | Gebhard et al. | D12/129 X |
| 4,786,064 | 11/1988 | Baghdasarian | 280/30 |
| 5,230,523 | 7/1993 | Wilhelm | 280/30 |

*Primary Examiner*—Brian L. Johnson
*Assistant Examiner*—Michael Mar

[57] ABSTRACT

A collapsible multi-use baby carriage having a structure transformable into a dining chair, a safety seat in a car, a cradle, and a bed, comprising a seat, a backrest pivotally connected with the seat to change the angle of the backrest against the seat, a U-shaped hand rest pivotally connected with the backrest to possibly alter its angle against the backrest and having two opposite side tubes possible to be shortened and a windable support plate provided between the two opposite side tubes and windable on a winding tubular shaft housed in a front tube of the hand rest and to be pulled out thereof for putting foods thereon, and two front and two rear casters pivotally connected with the bottom of the seat and foldable to the bottom of the seat.

1 Claim, 9 Drawing Sheets

COLLAPSIBLE MULTI-USE BABY CARRIAGE

BACKGROUND OF THE INVENTION

This invention concerns a collapsible multi-use baby carriage transformable into a dining chair, a cradle, a bed and a safety chair usable in a car.

Though there are many kinds of baby carriages in use and in market, but most of them are only used as a baby carriage for carrying a baby, not provided with other uses. If it is made for multi-use, it often has disadvantages as follows.

1. It has too many components, and has to be recombined for different uses, inconvenient.

2. It cannot be collapsed to a small dimension, inconvenient for carrying.

3. It cannot possess many uses, such as a dining chair a cradle, a bed, a safety chair used in a car, etc, in addition to a baby carriage.

SUMMARY OF THE INVENTION

A purpose of this invention is to offer a collapsible baby carriage transformable into a dining chair, a cradle, a bed, and a safety chair used in a car.

Another purpose of this invention is to offer a collapsible multi-use baby carriage simple in collapsing for carrying.

The main features of this invention is that a seat has two opposite sides each provided with a chamber a fitting plate in a front and a rear portion, a locking member having several grooves on its top on an upper rear portion of each of two opposite sides, that a backrest is provided with a control rope in each of two opposite sides, with the control rope having one end bound on an adjusting plate and the other end bound on a locking member so that the adjusting plate can control the locking member, that the seat and the backrest can be adjusted in a mutual angle by function of the adjusting plate and the locking members, that a U-shaped hand rest adjustable in its length and its angle is pivotally connected with the backrest, that the hand rest has a windable plate to be wound on a winding tubular shaft housed in a front tube so that the windable plate, usable for putting food thereon, can be pulled out and pushed in to a desired length along two opposite side tubes which are structured to be shortened to various length.

DETAILED DESCRIPTION OF THE INVENTION

Figure 1:
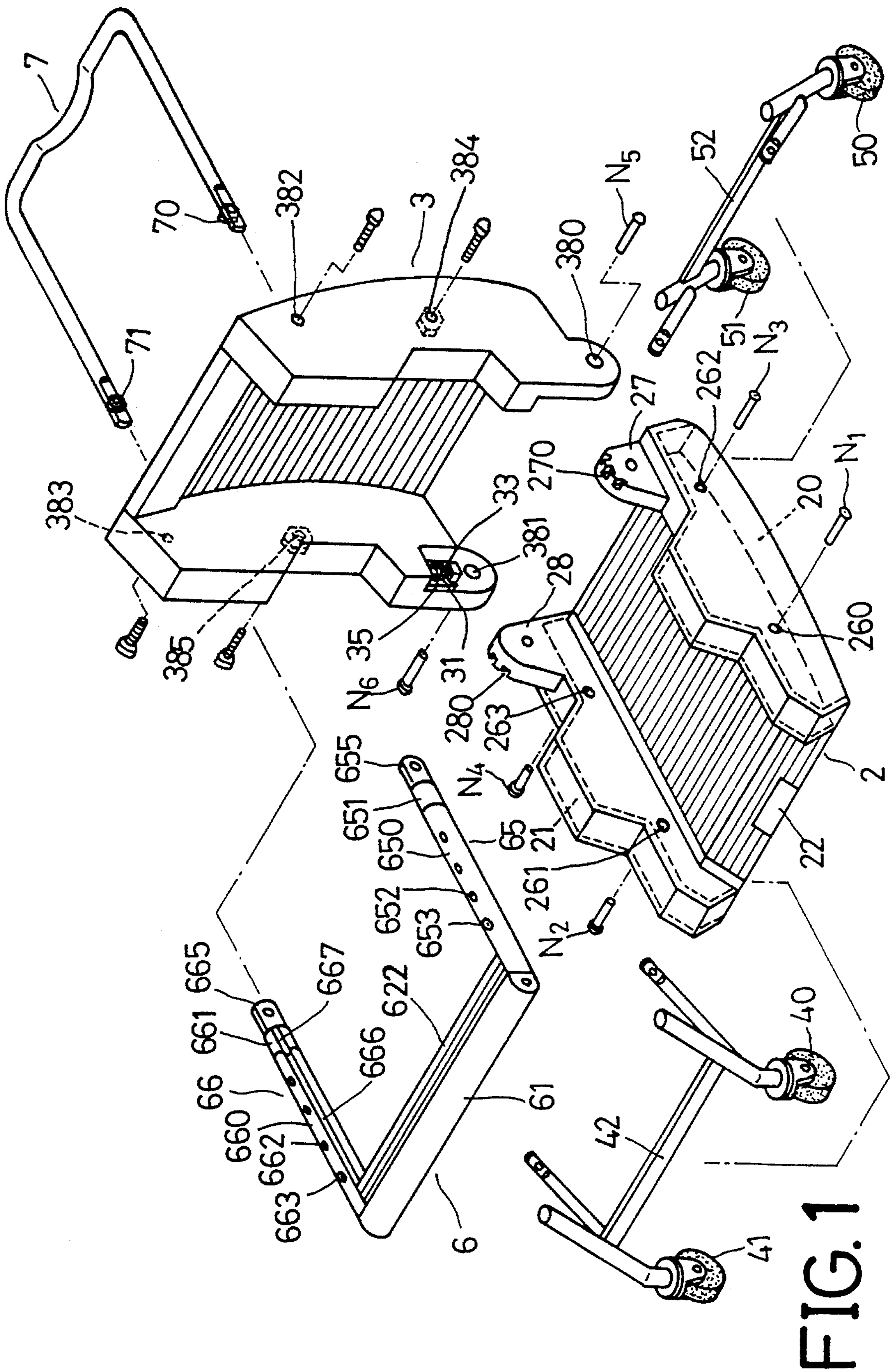
FIG. 1 is an exploded perspective view of a collapsible multi-use baby carriage in the present invention.
Figure 2:
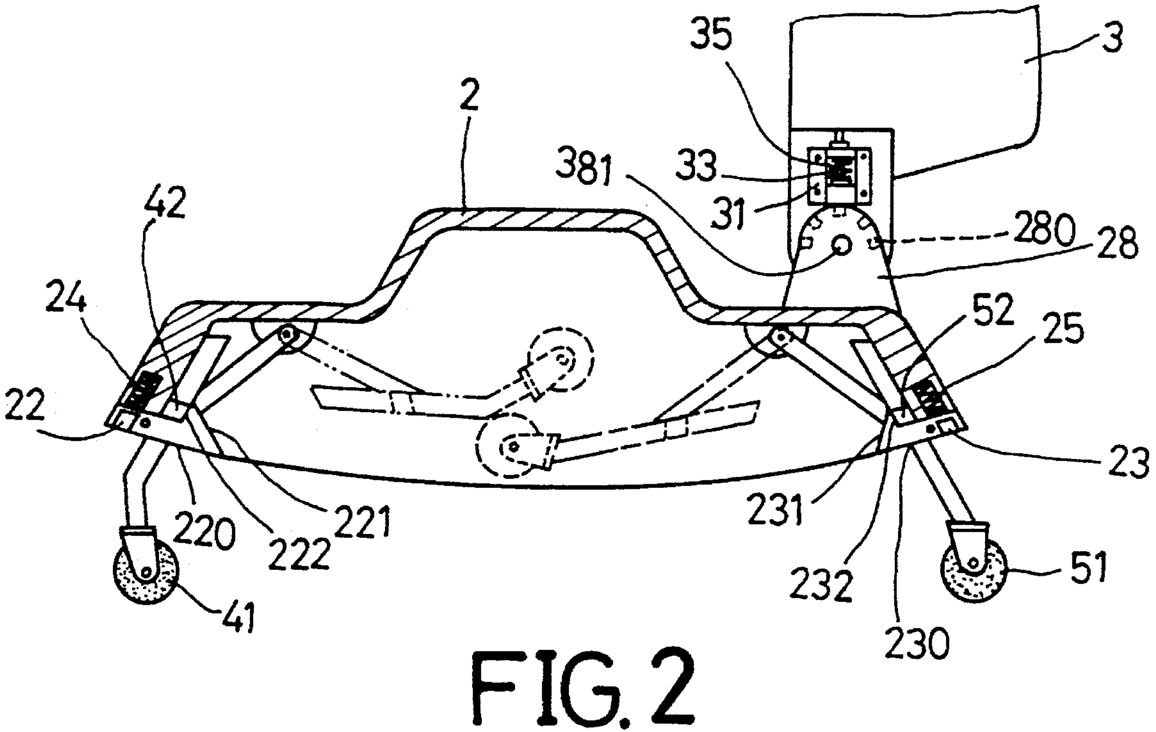
FIG. 2 is a partial side cross-sectional view of the collapsible multi-use baby carriage in the present invention.
Figure 3:
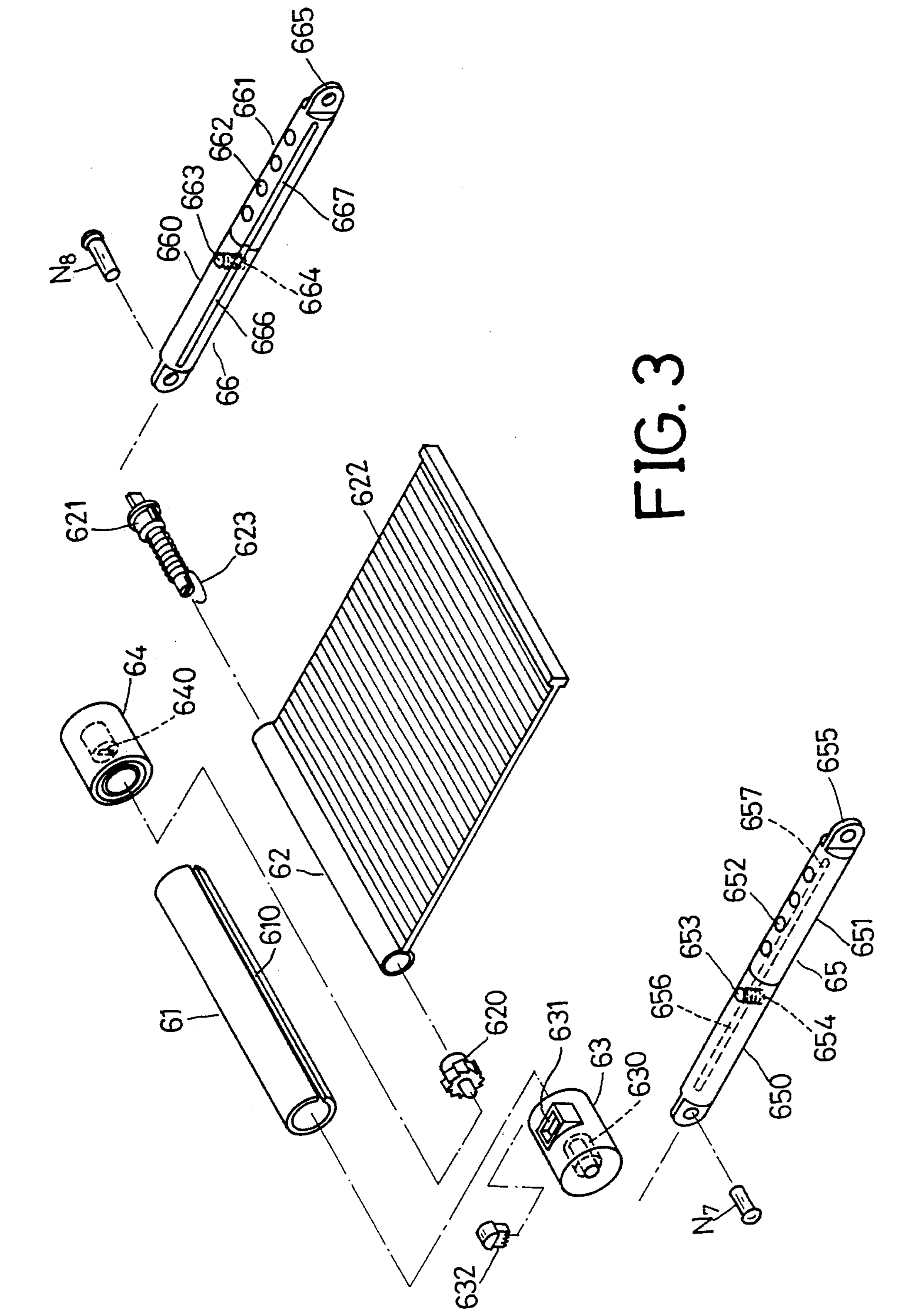
FIG. 3 is an exploded perspective view of a hand rest of the collapsible multi-use baby carriage in the present invention.

A collapsible multi-use baby carriage in the present invention, as shown in FIGS. 1, 2 and 3, comprises a seat 2, a backrest 3, two front casters 40, 41, two rear casters 50, 51, a hand rest 6 and a handle 7 combined together.

The seat 2 has two opposite sides each provided with an intermediate projecting portion, two chambers 20, 21 each in the two opposite sides, two fitting plates 22, 23 each in a front side and a rear side extending inward to form two locking hooks 220, 230 having two sloping surfaces 221, 231 at their ends and two stops 222, 232 at an outer sides of the sloping surfaces 221, 231. The seat 2 also has two springs 24 25 on the two fitting plates 22, 23, two pairs of round holes 260, 262; 261, 263 in the two sides, two locking members 27, 28 provided upright on upper rear portions of the two sides and having several locking grooves 270, 280 on upper surfaces.

The backrest 3 has two vertical opposite sides extending forward from two sides of a central portion for the back of a baby to rest on and pivotally connected with the two locking members 27, 28 of the seat 2 to adjust the angle of the backrest against the seat 2. The backrest 3 also has two angle adjusters 30, 31 lower portions of the two opposite sides, and each angle adjuster has an extensible rod 32, 33, two compress springs 34, 35 fitted around the rods 32, 33, two control ropes 36, 37 pivotally connected on top of the rods 32, 33, two rivet holes 380, 381 each in the two sides in the lower portion, four ratchet seats 382, 383, 384, 385 in an upper and an intermediate portion, an adjusting plate 39 on a rear upper portion, and two control ropes 36, 37 at both sides of the adjusting plate 39.

The two front and the two rear casters 40, 41; 50, 51 are respectively assembled pivotally under the seat 2, having a plate connecting rod 42, 52 respectively connecting laterally each other.

The hand rest 6 consists of a front tube 61 provided with a lengthwise slot 610, a winding tubular shaft 62 deposited in the tube 61, a ratchet 620 fitted in a right end opening and a support rod 621 fitted in a left end opening, a windable support plate 622 clamped in the wall. The support rod 621 has a spring 623 around itself, and the spring has its right end hooked on the rod 621 and its left end hooked on the winding tubular shaft 62. The front tube 61 has both end openings closed with two cylindrical side caps 63, 64, and the cap 63 has a lateral groove 631 and a lengthwise groove 631 with a locking block 632 fitted therein and engagingly rotating clockwise the ratchet 620 but stopping counterclockwise the ratchet 620. The cap 64 has a lengthwise groove 640. Outer ends of two extensible tubes 65, 66 are respectively connected with the outer ends of the two caps 63, 64, consisting of an upper and a lower tube 650, 660; 651, 661. The upper tubes 650, 660 each have two ball holes 652, 662 for steel balls 653, 663 to fit therein and two springs 654, 664 each laid under the balls 653, 663 to urge the bails. The lower tubes 651, 661 each have a pair of ratchet seats 655, 665 corresponding to the ratchet seats 384, 385 for adjusting the engaging positions of the ratchet seats 384, 385 and 655, 665 so as to alter the bending angle of the hand rest 6. The upper and the lower tubes 650, 660 and 651, 661 also have straight slots 656, 657, 666, 667 in their inner sides.

The handle 7 is shaped as a channel, having a ratchet seat 382, 383 respectively in two ends to correspond to the ratchet seats 382, 383.

In assembling, as shown in FIGS. 1, 2, 3 and 4, first, rivets N1, N2, N3 and N4 are made to pass through the round holes 260, 261, 262, and 263 to fix the front and the rear casters 40, 41, 50, 51 under the seat 2. Then rivets N5 and N6 are made to pass through the locating holes 380, 381 to fix firmly the backrest 3 with the locking members 27, 28 of the seat 2, with the angle adjusters 30, 31 just facing the locking grooves 270, 280. Next, the winding tubular shaft 62 is fitted substantially in the front tube 61 and the windable support plate 622 is wound on the shaft 62. After that, the ratchet 620 is inserted in the left side opening of the shaft 62, and the spring 623 is fitted around the support rod 621, with its left end hooked at a proper spot in the shaft 62 and its right end hooked on the support rod 621. Then, the side cap 63 is pivotally fixed on the left end of the front tube 61 with the locking block 632 inserted in the lengthwise groove 631 and engaging the ratchet 620, and the side cap 64 is pivotally fitted in the right end of the front tube 61, with the right end of the support rod 621 fitted in the lengthwise groove 640, and then the extensible rods 65, 66 are firmly fixed with the outer ends of the caps 63, 64 by means of rivets N7, N8. Now, the ratchet seats 655, 665 of the rods 65, 66 are combined to engage with the ratchet seats 384, 385. Lastly, the handle 7 is combined with the backrest 3, with the two ratchet seats 70, 71 engaging with the ratchet seats 382, 383, to finish assembling of the baby carriage.

Figure 4:
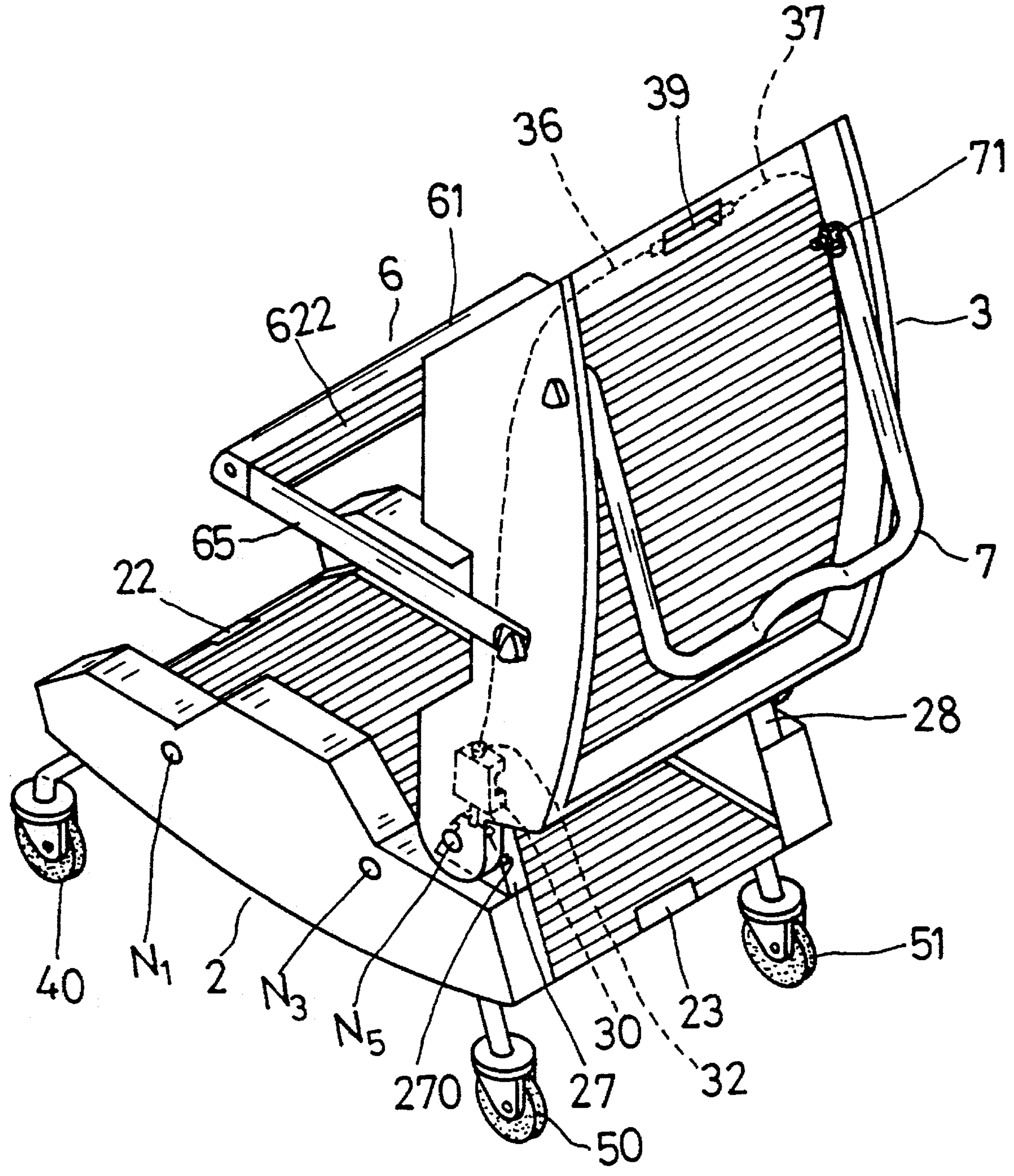
FIG. 4 is a perspective view of the collapsible multi-use baby carriage in the present invention.
Figure 5:
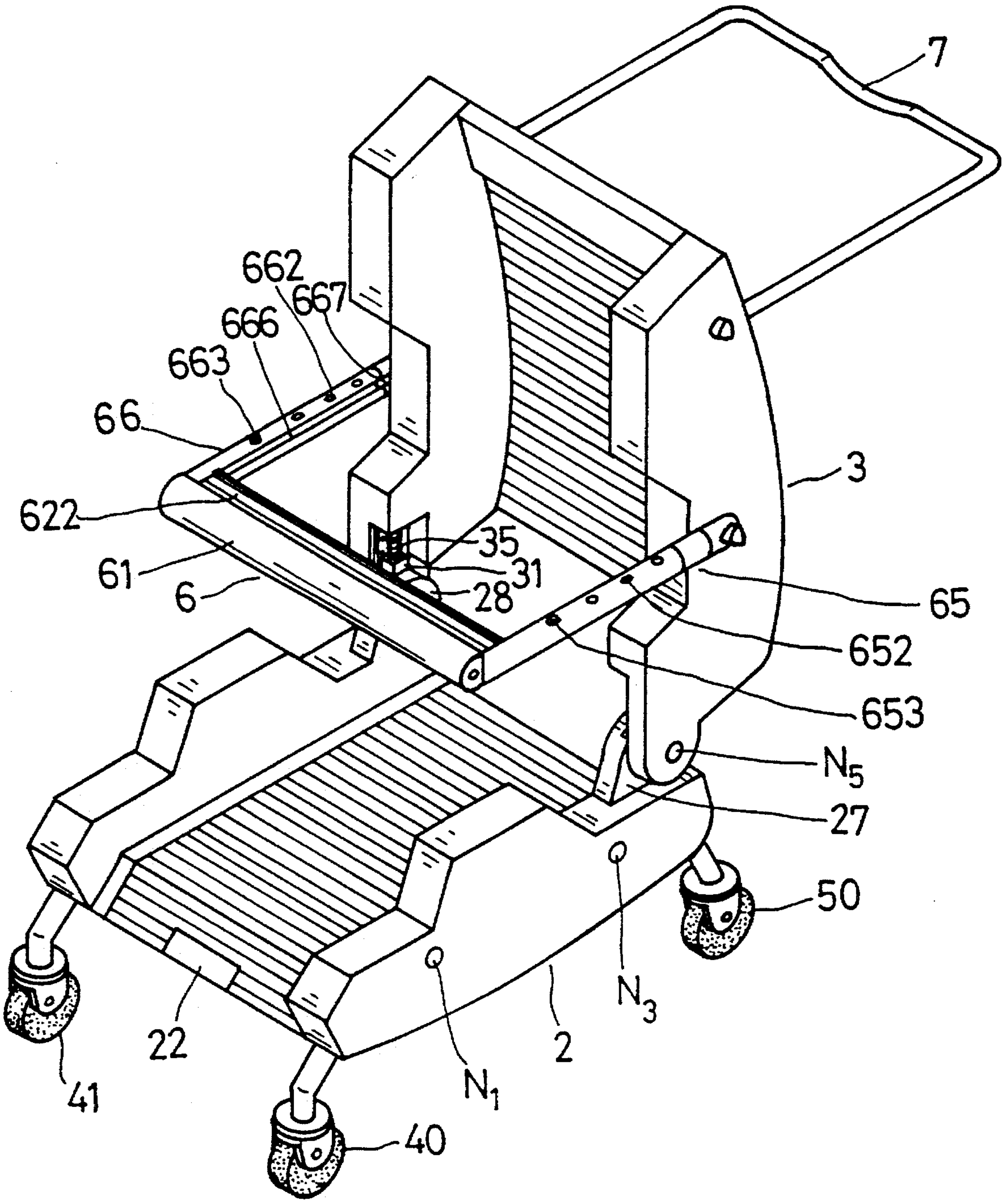
FIG. 5 is a perspective view of the collapsible multi-use baby carriage in the present invention, showing it being formed as a baby carriage.
Figure 6:
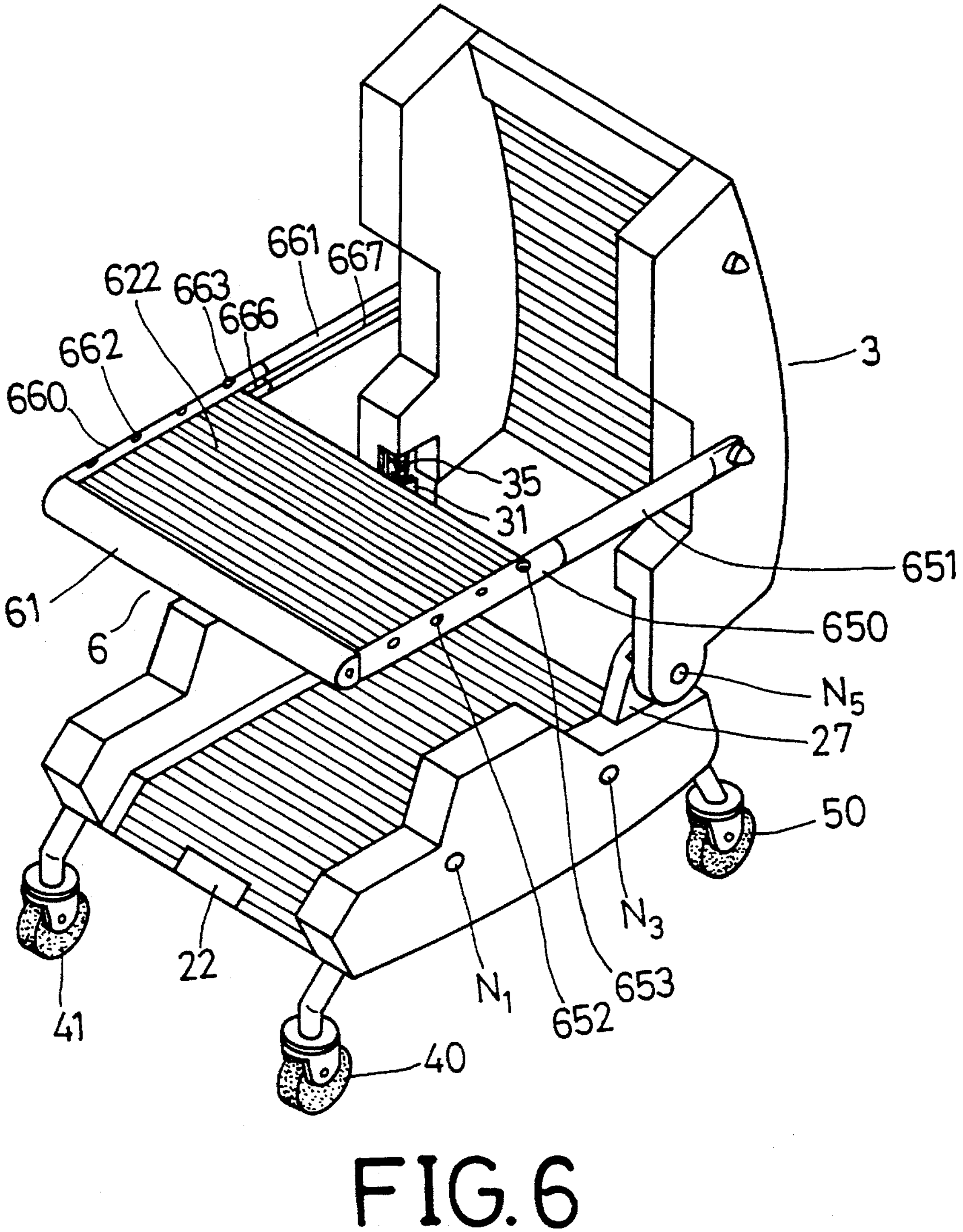
FIG. 6 is s perspective view of the collapsible multi-use baby carriage in the present invention, showing it transformed into a dining chair.

In using, as shown in FIGS. 4 and 5, in case of using it as a baby carriage, the adjusting plate 39 is manually moved to pull up the two control ropes 36, 37 and consequently the movable rods 32, 33 is pulled up. Then the locking grooves 270, 280 of the locking members 27, 28 do not engage the rods 32, 33, permitting the backrest 3 adjusted in its angle forward or backward to a proper position. In the meantime, during lifting movement of the rods 32, 33, the compress springs 34, 35 are compressed. So releasing of the adjusting plate 39 immediately allows the rods 32, 33 to fall down to engage the grooves 270, 280 to lock the adjusted position of the backrest 3. Next, the hand rest 6 and the handle 7 are adjusted in their angle to the backrest 3 by operation of the ratchet seats 382, 382, 384, 385, 654, 664, 70, 71 such that a baby may sit thereon and a user may easily push the baby carriage.

In case of using this baby carriage as a dining chair, as shown in FIGS. 3 and 5, firstly, the extensible rods 65, 66 are adjusted to a shorter length by pressing the front tube 61 rearward, forcing the two balls 653, 663 compressed down by the inner surface of the opening of the rear tubes 650, 660 to slide along the inner surface of the tubes 650, 660, with the springs 654, 664 compressed down to elastically urge the balls 653, 663 until the balls reaches the nearest next ball holes 652, 662 and are pushed up by the springs to engage the next ball holes to lock the hand rest 6 at the adjusted shortened position. If the hand rest 6 is needed to be further shortened, repeating the just described operation can shorten the length of the hand rester 6 to the shortest length, by engaging the balls 653, 663 with the most inward ball holes 652, 662. Provided that the hand rest 6 is wanted to be lengthened from the shortest position, the front tube 61 is to be pulled out to a proper length and stopped by the balls engaging one of the ball holes. If the support plate 622 is wanted to be used, at first the hand rest 6 has to be operated to become horizontal by adjusting the ratchet seats 655, 665, and then the windable support plate 622 is pulled out to a proper length and located at the position. As the ratchet 620 and the locking block 632 rotate only clockwise, but not rotate counterclockwise, preventing the plate 622 from winding back. Therefore, the support plate 622 can be used for placing food or something thereon, with this baby carriage transformed into a dining chair.

In case that the support plate 622 is to be wound back, the locking block 632 has to be manually pushed forward, disengaging its bottom from the ratchet 620 may permit the spring 621 recover its elasticity to let the shaft 62 wind the support plate 622 around itself, and thus the plate 622 is wound back to its original position.

Figure 7:
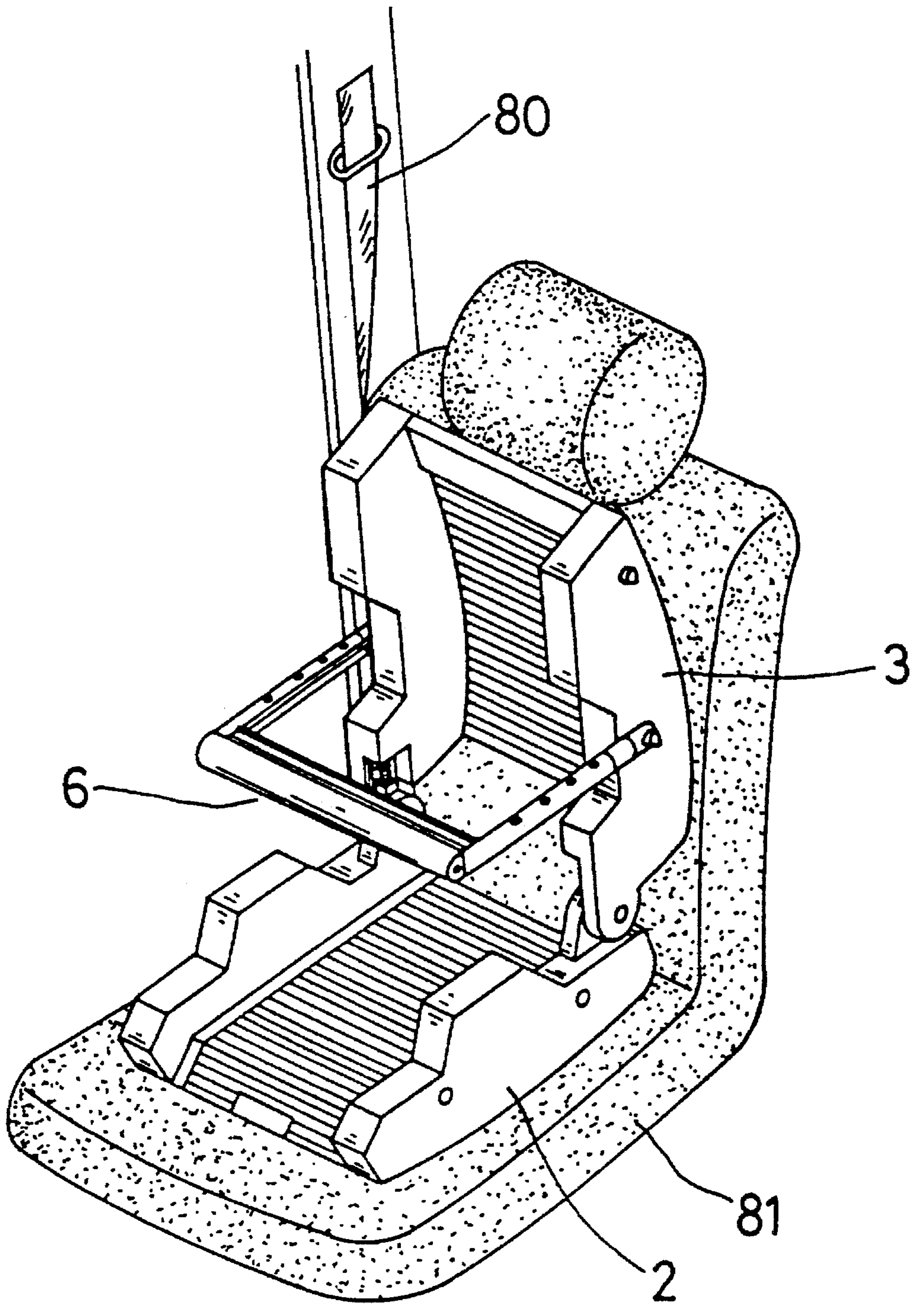
FIG. 7 is a perspective view of the collapsible multi-use baby carriage in the present invention, showing it transformed into a safety chair used in a car.

If this baby carriage is wanted to be used as a safety seat in a car, referring to FIGS. 2 and 7, firstly, the fitting plate 22 is pushed upward, moving down the locking hook 220 and causing the stop 222 disengage from the connecting rod 42. Then the front casters 40, 41 may be folded to the bottom of the seat 2, and the fitting plate 23 is pushed upward, causing the stop 232 disengage from the connecting rod 52. Then the rear casters 50, 51 may be folded to the bottom of the seat 2. Lastly, the adjusting plate 39 is handled to adjust the two angle adjusters 30, 31, positioning the seat 2 to a proper angle against the backrest 3, and then the hand rest 6 is adjusted in its angle by adjusting the ratchet seats 384, 385, 655, 665 and the extensible rods 65, 66 such that a baby may sit thereon stably with a safety belt 80 extending around the backrest 3, then this safety seat is deposited on a car seat 81.

After the front and the rear casters 40, 41, 50, 51 are folded for using this baby carriage as a safety seat, if it is to be transformed back to the carriage, the connecting rod 52 has to be pulled out to contact and push down the sloping surface 231 of the hook 230, and at the same time compress the spring 25 until the sloping surface reaches the lowest position, locking the rear casters 50, 51 in place. Then the spring 25 recovers its place with its own elasticity, with the stop 232 engaging the connecting rod 52, hampering the rear casters 50, 51 from folded back to the seat 2. Similarly, the connecting rod 42 is pushed out to the outermost position, with the stop 222 engaging the connecting rod 42, hampering the front casters 40, 41 from folded back to the seat 2.

Figure 8:
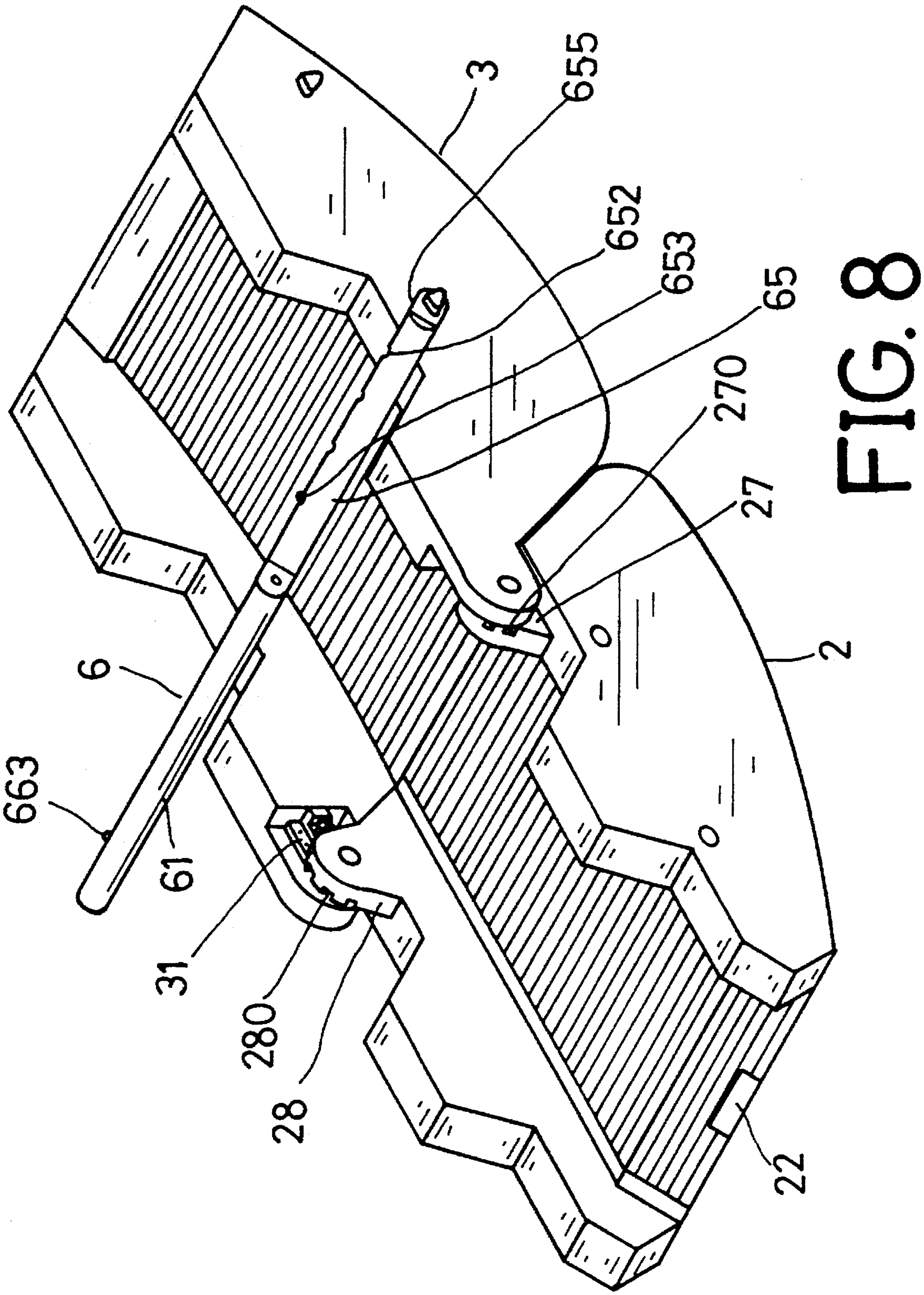
FIG. 8 is a perspective view of the collapsible multi-use baby carriage in the present invention, showing it transformed into a cradle.

When this baby carriage is wanted to be used as a cradle, referring to FIG. 8, the front and the rear casters 40, 41, 50, 51 are folded to the bottom of the seat 2 in the way as described above. Then the angle of the seat 2 and the backrest 3 is adjusted also in the way described above, letting the bottoms of the seat 2 and the backrest 3 form a curve sloping upward to both the outer sides so that they can be rocked for facilitating a baby lying there to fall asleep. In case that the cradle may not be needed to rock and to be used as a bed, the handle 7 is pulled out by handling the ratchet seats 382, 70, 383, 71 and the bottom of the handle 7 is utilized as a fulcrum to stop the backrest 3, allowing the cradle become a bed immovable.

Figure 9:
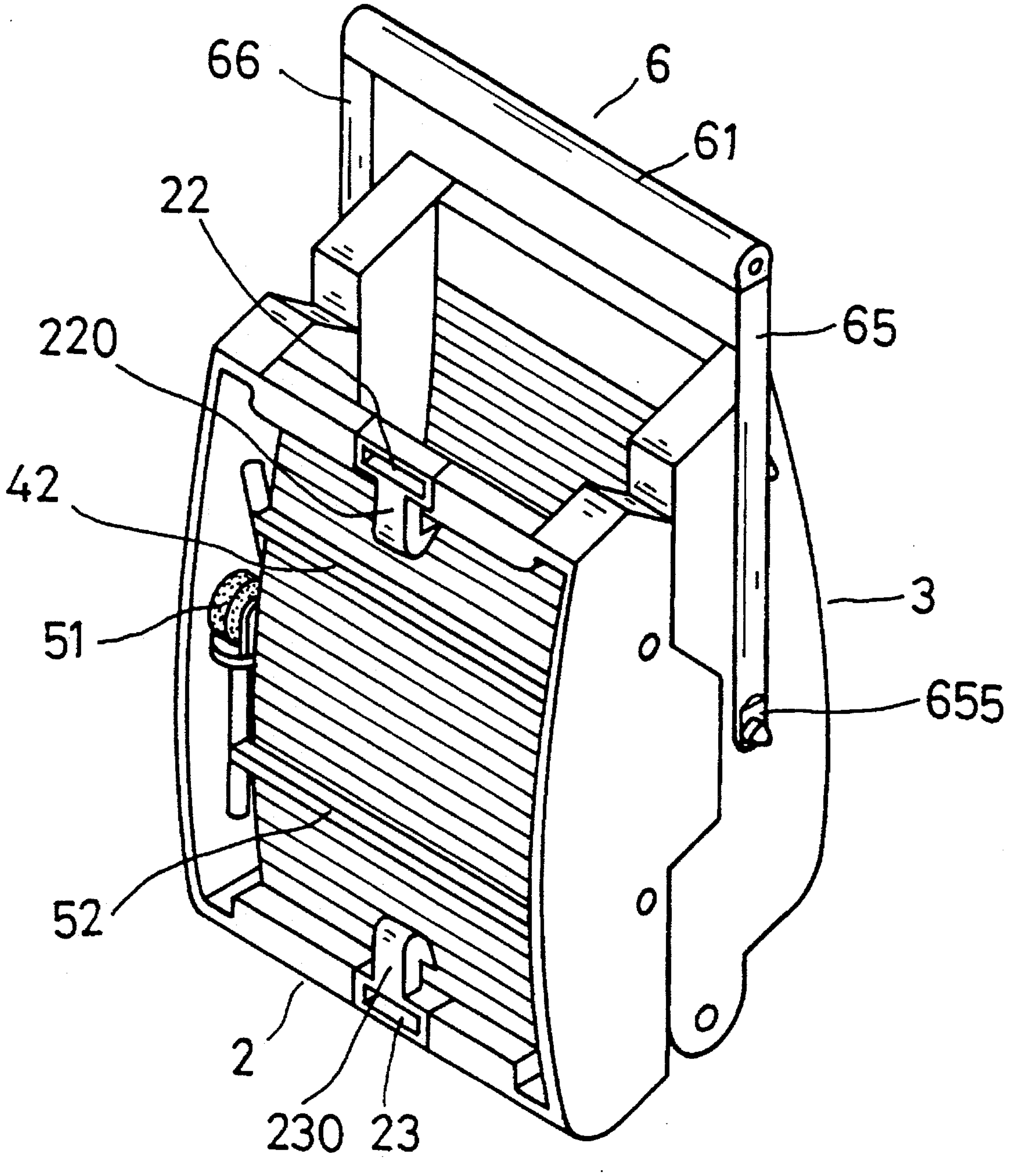
FIG. 9 is a perspective view of the collapsible multi-use baby carriage in the present invention, showing it collapsed for carrying.

If this baby carriage is to be carried or transported, as shown in FIG. 9, the front and the rear casters 40, 41, 50, 51 are to be folded to the bottom of the seat 2, and the seat 2 is to be folded up to stand side by side abutting the backrest 3 by handling the adjusting plate 39, forcing the two movable rods 32, 33 retreat. Then the handle 7 is to be swung down to rest beside the backrest 3, with the hand rest 6 adjusted in its angle to stand up parallel to the backrest 3, finishing collapsing this baby carriage.

What is claimed is:

1. A collapsible multi-use baby carriage comprising:

a) a seat having first opposite sides each provided with an upper surface with an intermediate projecting surface and extending upward from the seat;

b) a backrest pivotally connected with the seat, the backrest having second opposite projecting sides with a front surface complementary to the upper surface of each of the first opposite sides of the seat;

c) front and two rear caster assemblies pivotally connected to the seat, so as to be movable between extended positions wherein said caster assemblies extend below said seat and retracted positions wherein said caster assemblies are retracted into the first opposite sides, each of said caster assemblies including a pair of leg members, a transverse arm connecting the pair of leg members, and a pair of link arms, each link arm having an upper end pivotally connected to an underside of said seat and a lower end rigidly connected to a respective leg member at a midpoint thereof, and a spring biased latch associated with each caster assembly which includes a pivotal plate member having a user actuator portion located in an open recess formed within forward and rearward ends of said seat and a hook portion for engaging said transverse arm for releasably locking said caster assembly in the extended position;

d) a U-shaped hand rest connected to said backrest and having: a front housing tube; a winding tubular shaft located in said front housing tube; a windable support plate having an inner end clamped to the winding tubular shaft so as to be wound on said winding tubular shaft; a first ratchet connected to a second end opening of said winding tubular shaft; a support rod connected to a first end opening of said winding tubular shaft; side caps connected in end openings of said front housing tube two telescopically adjustable side tubes connected between said side caps and said backrest, each respectively consisting of a front tube and a rear tube latched together by means of a steel ball urged by a spring in the front tube so as to engage one of a plurality of ball holes in the rear tube e) a U-shaped handle for pushing the carriage, connected to the backrest by a second ratchet so as to allow angular adjustment of the U-shaped handle relative to the backrest;

f) a chamber provided in each of said first opposite sides of said seat to accommodate said caster assemblies in their retracted positions;

g) a locking member provided on a rear upper surface of each said first opposite sides of said seat and having a plurality of spaced apart grooves;

h) movable rods located on each backrest for engaging one of the plurality of spaced apart grooves;

i) control ropes provided in the backrest; each having an end connected to a movable rod such that said movable rods are pulled up by the ropes disengaging the movable rods from the spaced apart grooves such that the relative angular positions of the seat and the backrest can be adjusted enabling said baby carriage to be transformed into a dining chair, a safety seat, a cradle, a bed, or to be collapsible for carrying.

* * * * *